United States Patent
Lim et al.

(10) Patent No.: US 12,133,003 B2
(45) Date of Patent: Oct. 29, 2024

(54) SYSTEM AND METHOD FOR ENHANCING A COLLABORATIVE CAMERA INSTALLATION EXPERIENCE

(71) Applicant: MOTOROLA SOLUTIONS, INC., Chicago, IL (US)

(72) Inventors: Bing Qin Lim, Bayan Lepas (MY); Cody Yarbrough, Herring Cove (CA); Heetat Goey, Sungai Petani (MY); Ming Yeh Koh, Bdr Baru Air Itam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 106 days.

(21) Appl. No.: 18/062,724

(22) Filed: Dec. 7, 2022

(65) Prior Publication Data

US 2024/0196107 A1    Jun. 13, 2024

(51) Int. Cl.
| | |
|---|---|
| *H04N 23/90* | (2023.01) |
| *G06V 20/17* | (2022.01) |
| *G06V 20/40* | (2022.01) |
| *H04N 23/69* | (2023.01) |

(52) U.S. Cl.
CPC ............ *H04N 23/90* (2023.01); *G06V 20/17* (2022.01); *G06V 20/48* (2022.01); *H04N 23/69* (2023.01)

(58) Field of Classification Search
CPC ........ H04N 23/90; H04N 23/69; G06V 20/17; G06V 20/48
See application file for complete search history.

(56) References Cited

U.S. PATENT DOCUMENTS

| | | |
|---|---|---|
| 10,486,788 B2 | 11/2019 | Piette et al. |
| 10,602,119 B1 | 3/2020 | Bakhtazad et al. |
| 10,735,671 B2 | 8/2020 | Marman et al. |
| (Continued) | | |

FOREIGN PATENT DOCUMENTS

| | | | | |
|---|---|---|---|---|
| CN | 115393787 A | * | 11/2022 | |
| EP | 3772046 A1 | * | 2/2021 | ....... H04N 21/41407 |
| KR | 101790592 B1 | | 11/2017 | |

OTHER PUBLICATIONS

Designing a Site with Avigilon Self-Learning Video Analytics, Avigilon Corporation, Revision: 4—EN, 2015-2021, all pages.
(Continued)

*Primary Examiner* — Nasim N Nirjhar

(57) ABSTRACT

A system and method for enhancing a collaborative camera installation experience is disclosed. The method includes running an at least substantially similar test analytic on each of the first video and the second video to generate: first analytic output data corresponding to analytic processing of the first video; and second analytic output data corresponding to analytic processing of the second video. The method also includes assembling for Graphical User Interface (GUI) display to the security camera acquirer, the first and second analytic output data, or performance data derived therefrom. The method also includes, after the assembling for the GUI display, receiving input that one of a plurality of three-dimensionally defined points is selected, thereby identifying a confirmed installation point where a video security camera, different than an at least one substitutional camera, will be permanently installed.

19 Claims, 13 Drawing Sheets

(56) References Cited

U.S. PATENT DOCUMENTS

| | | |
|---|---|---|
| 11,354,994 B1 | 6/2022 | Staudacher et al. |
| 11,495,119 B1 | 11/2022 | Lim et al. |
| 2018/0332213 A1 | 11/2018 | Kucharski et al. |
| 2020/0326704 A1 | 10/2020 | Blanco et al. |
| 2022/0397686 A1* | 12/2022 | Scacchi ................ G01S 19/485 |

OTHER PUBLICATIONS

Brimhall, Brent, et al.: "Accurate Representation of Camera Field of View in Two-Dimensional Mapping Applications", U.S. Appl. No. 17/541,101, filed Oct. 15, 2021, all pages.

\* cited by examiner

SYSTEM AND METHOD FOR ENHANCING A COLLABORATIVE CAMERA INSTALLATION EXPERIENCE

BACKGROUND

Within the security industry, software exists for helping a user in designing a system of cameras (for example, selecting appropriate cameras, lenses, storages appliances, etc. to be deployed within one or more geographic areas). An example of such software is the Avigilon System Design Tool (SDT)™ produced by Motorola Solutions, Inc. Such software can be useful for planning the design and installation of a security system. However, for a variety of reasons, there are limitations on the extent to which an actual installation site can be modeled in a computer system, and so at the time of installation (and even later during a post-installation period) non-trivial adjustments to an installation plan may very well be required.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
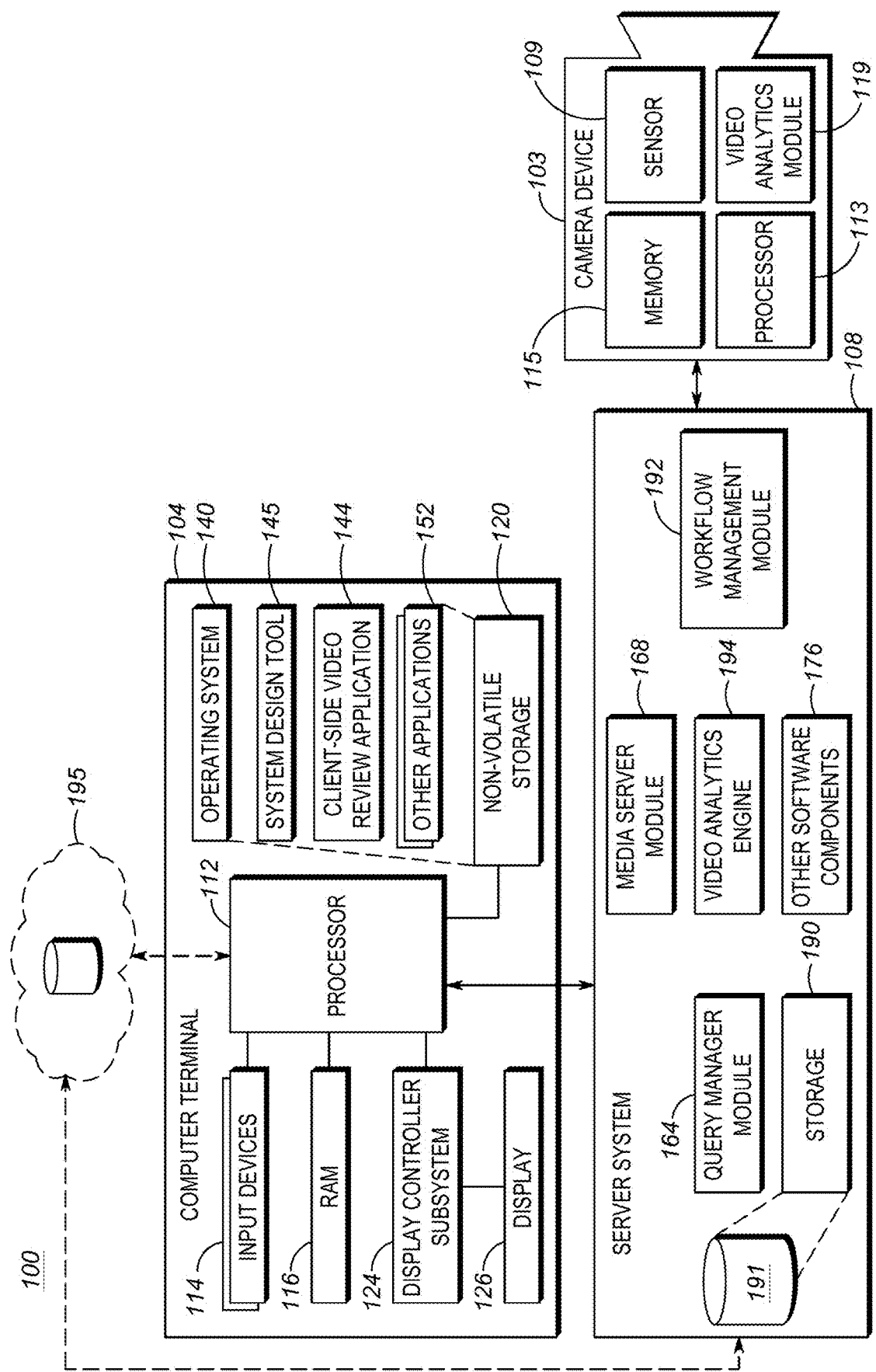
FIG. 1 is a block diagram of a security system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method for enhancing a collaborative installation experience between a security camera installer and a security camera acquirer. The computer-implemented method includes receiving first video captured by an at least one substitutional camera while temporarily positioned at a first three-dimensionally defined point of a plurality of different three-dimensional points located at an installation site associated with the security camera acquirer. The computer-implemented method also includes receiving second video captured by the at least one substitutional camera while temporarily positioned at a second three-dimensionally defined point of the plurality of different three-dimensional points. The computer-implemented method also includes running an at least substantially similar test analytic on each of the first video and the second video to generate: i) first analytic output data corresponding to analytic processing of the first video; and ii) second analytic output data corresponding to analytic processing of the second video. The computer-implemented method also includes assembling for Graphical User Interface (GUI) display to the security camera acquirer, the first and second analytic output data, or performance data derived therefrom. After the assembling for the GUI display, input is received. The input being that one of the first and second three-dimensionally defined points is selected, thereby identifying a confirmed installation point where a video security camera, different than the at least one substitutional camera, will be permanently installed. The computer-implemented method also includes providing location information corresponding to the confirmed installation point to the security camera installer to enable permanent installation of the video security camera by the security camera installer. After the permanent installation of the video security camera by the security camera installer, an actual installation point of the video security camera is verified as to whether it matches the confirmed installation point.

In accordance with another example embodiment, there is provided a computer-implemented method for verifying a security camera installing. The computer-implemented method includes verifying that at least one of a plurality of detected parameters corresponding to a three-dimensionally defined point of actual installation of the security camera matches a respective parameter of a planned installation point. The at least one of the detected parameters includes at least one of the following: a camera field of view, a camera installation orientation, a camera configuration, a camera model, a camera installation location and a camera installation height. When it is determined from the verifying that the at least one of the detected parameters is not matching within a matching range to the respective parameter of the planned installation point, visual guidance is generated on a display of a mobile computing terminal. The visual guidance provides instructions on correcting the actual installation to facilitate corrective human action to bring the at least one of the detected parameters within the matching range.

In accordance with yet another example embodiment, there is provided a system that includes at least one processor configured to receive first video captured by an at least one substitutional camera while temporarily positioned at a first three-dimensionally defined point of a plurality of different three-dimensional points located at an installation site associated with a security camera acquirer. The at least one processor is also configured to receive second video captured by the at least one substitutional camera while temporarily positioned at a second three-dimensionally defined point of the plurality of different three-dimensional points. The at least one processor is also configured to run an at least substantially similar test analytic on each of the first video and the second video to generate: i) first analytic output data corresponding to analytic processing of the first video; and ii) second analytic output data corresponding to analytic processing of the second video. The at least one processor is also configured to output location information corresponding to a confirmed installation point to enable permanent installation of a video security camera, different than the at least one substitutional camera, by a security camera installer. The at least one processor is also configured to verify, after the permanent installation of the video security camera by the security camera installer, that an actual installation point of the video security camera matches the confirmed installation point. The system also includes a computer terminal that includes a display configured to graphically present the first and second analytic output data, or performance data derived therefrom. The computer terminal also includes at least one input device configured to be user operated to provide input that one of the first and second three-dimensionally defined points is selected, thereby identifying a confirmed installation point where the video security camera will be permanently installed.

Each of the above-mentioned embodiments will be discussed in more detail below, including discussing example system and device architectures of the system in which the embodiments may be practiced, and also later herein disclosed via illustration are processing blocks for achieving an improved technical method, device, and system for computerized enhancement of a collaborative camera installation experience.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. Additionally, it will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, system design tool module 145, and other applications 152, or parts thereof, may be temporarily loaded into a volatile store such as the RAM 116. The processor 112, in addition to its operating system functions, can enable execution of the various software applications on the computer terminal 104.

Regarding the video review application 144, this can be run on the computer terminal 104 and may include a search User Interface (UI) module for cooperation with a search session manager module in order to enable a computer terminal user to carry out actions related to providing input in relation images, live video and video recordings (such as, for example, input to facilitate carrying out security event searches, appearance searches, etcetera). Also, regarding the aforementioned search session manager module, this provides a communications interface between the search UI module and a query manager module 164 of the server system 108. In at least some examples, the search session manager module communicates with the query manager module 164 through the use of remote procedure calls. The query manager module 164 receives and processes queries originating from the computer terminal 104, which may facilitate retrieval and delivery of specifically defined video data (and respective metadata) in support of, for example, client-side video review, video export, managing event detection, etc. In this regard, the query manager module is communicatively coupled to one or more data stores 190 from which defined data may be retrieved (described later herein in more detail). In accordance with some examples, the query manager module 164 captures operational control inputs (for instance, operational control inputs sourced from a user operating the input devices 114, which in turn may potentially impact at least one camera within the security system 100).

Regarding the system design tool module 145, this is software for helping a user in designing a system of security cameras (for example, selecting appropriate cameras, lenses, storages appliances, etc. to be deployed within one or more geographic areas). The system design tool module 145 may include code to generate a graphical user interface (for example, provided on the display screen 126). Images, video, selection tools, etcetera in relation to camera devices (or other types of sensor devices) may appear within the graphical user interface of the system design tool module 145. Such a graphical user interface may also be configured to allow a user to selectively view one or more security cameras within a visual map of a geographical area.

In accordance with at least one example, the system design tool module 145 includes code for generating a graphical user interface to identify and/or simulate the two-dimensional or three-dimensional placement of security cameras and their corresponding performance. For instance, the system design tool module 145 may permit graphical simulation in two-dimensions or three-dimensions, and also show how adding or replacing a security camera can impact performance. For instance, the user can operate the input devices 114 in connection with viewing performance (within a graphical user interface) both prior to and after placement of acquirable security cameras.

Still with reference to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by an at least one camera device 103 (camera 103) in the security system 100. The server system 108 also includes a video analytics engine 194. The video analytics engine 194 can, in some examples, be any suitable one of known commercially available software that carry out, as understood by a person of skill in the art, computer vision related functions (complementary to any video analytics performed within the housing of the security camera itself, which is sometimes referred to as analytics at the edge). Also, those skilled in the art will appreciate that, in some instances, the video analytics engine may be programmed with a detection classifier that evaluates a received video stream (for example, an image or part of an image of the video stream captured by the camera device 103) to determine if an instance of an object of interest that is defined in the detection classifier is detected or not from the evaluated video stream. Moreover, and as those skilled in the art will appreciate, in the case where machine learning (such as for example, neural network technology) is employed in detection and classification, percentage confidences can be generated in relation to likelihoods of detections and classifications.

Continuing on, the server system 108 also optionally includes a workflow management module 192 (the details of which are later herein described).

The server system 108 also includes a number of other software components 176. These other software components will vary depending on the requirements of the server system 108 within the overall system. As one example, the other software components 176 might include special test and debugging software, or software to facilitate version updating of modules within the server system 108. As another example, the other software components 176 might include a module to provide server-side support for the system design tool module 145 installed on the computer terminal 104. Also, those skilled in the art will appreciate that system design tool software is not limited to being run only within one or more of the computer terminal 104 and the server system 108. System design tool software may also be provided as a part of one or more cloud services 195, diagrammatically shown in FIG. 1 and described below in more detail.

Regarding the data store 190, this comprises, for example, one or more databases 191 which may facilitate the organized storing of recorded security video, non-video sensor data, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc.

Optionally, the security system 100 may include connections to the illustrated one or more cloud services 195. For example, the computer terminal 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). It will be understood that some example embodiments may include the cloud service(s) 195 which may include storage and/or run software modules complementary to (or in addition) to those provided by the server system 108 within the security system 100.

The illustrated security system 100 includes the at least one camera device 103 being operable to capture a plurality of images and produce image data representing the plurality of captured images (although any suitable number of camera devices are contemplated). The illustrated camera 103 is an image capturing device (as well as a security video camera). The camera 103 may also be a substitutional camera (further details of which are later herein provided). Furthermore, although only one camera device is shown in FIG. 1, it will be understood that the security system 100 may include any suitable number of cameras.

The camera 103 includes an image sensor 109 for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes at least one set of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

The camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Still with reference to FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system 100 illustrated in FIG. 1 only explicitly shows a video sensor device coupled to the server system 108, it will be understood that the security system 100 is not limited in contemplated compositions to just video sensor devices. Some examples of the security system 100 include a heterogeneous mixture of both video sensor devices and non-video sensor devices coupled to the server system 108. One type of non-video sensor device is a radar-based sensor device such as, for example, the Avigilon Presence Detector (APD)™ sold by Motorola Solutions, Inc.

Figure 2:
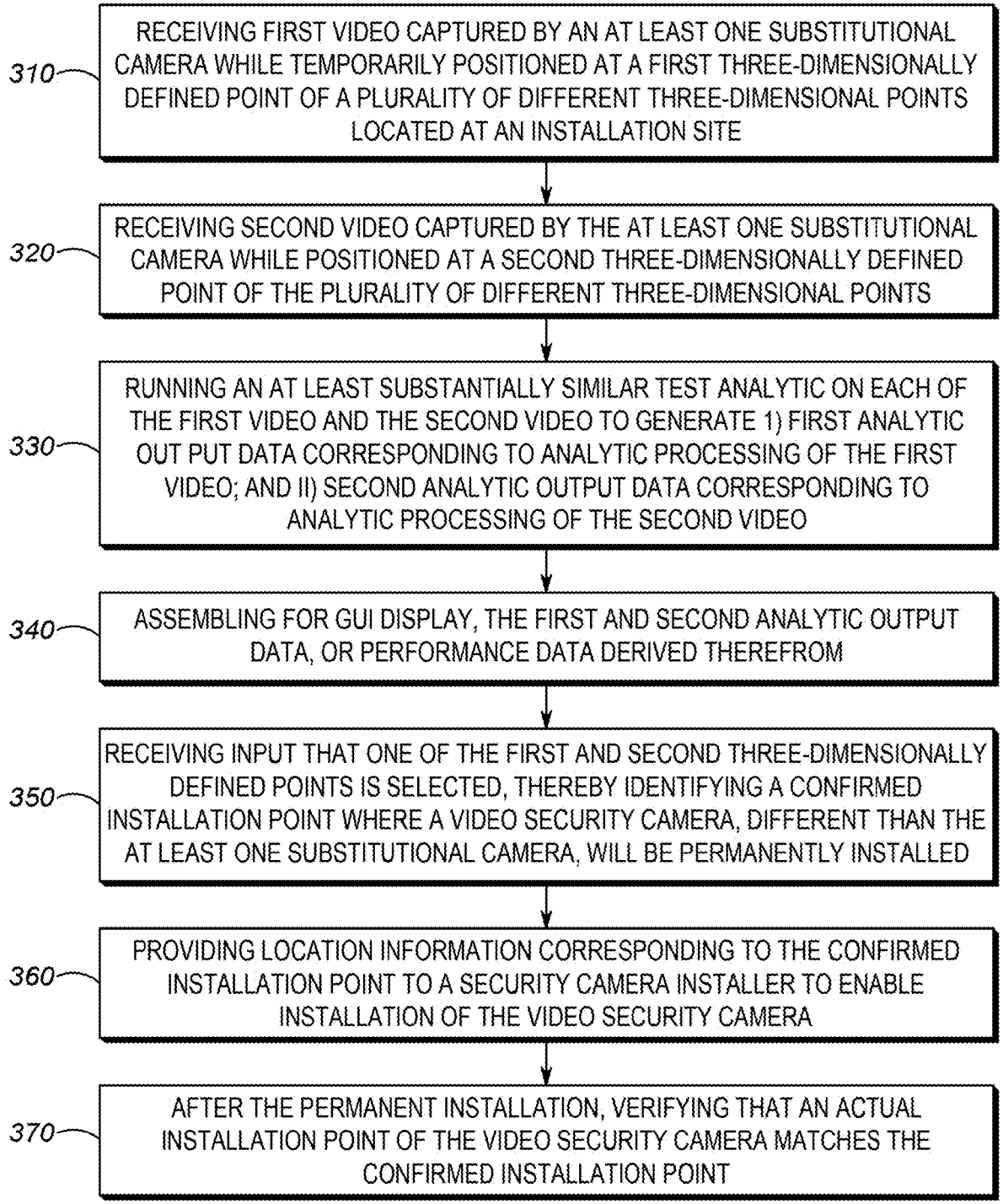
FIG. 2 is a flow chart illustrating a computer-implemented method, for enhancing a collaborative installation experience between a security camera installer and a security camera acquirer, in accordance with an example embodiment.

Reference is now made to FIG. 2. FIG. 2 is a flow chart illustrating a method 300 for enhancing a collaborative installation experience between a security camera installer and a security camera acquirer in accordance with an example embodiment. Firstly, in the method 300, first video captured by an at least one substitutional camera (for example, the camera 103) is received (310). The capturing of the first video occurs while the at least one substitutional camera is temporarily positioned at a first three-dimensionally defined point of a plurality of different three-dimensional points located at an installation site associated with the security camera acquirer.

Next in the method 300, second video captured by the at least one substitutional camera (for example, the camera 103) is received (320). The capturing of the second video occurs while the at least one substitutional camera is temporarily positioned at a second three-dimensionally defined point of the plurality of different three-dimensional points located at the installation site associated with the security camera acquirer.

Next in the method 300, an at least substantially similar test analytic is run (330) on each of the first video (i.e. the video described in relation to the action 310) and the second video (i.e. the video described in relation to the action 320). This is to generate: i) first analytic output data corresponding to analytic processing of the first video; and ii) second analytic output data corresponding to analytic processing of the second video.

Next in the method 300, the first and second analytic output data (or performance data derived therefrom) are assembled (340) for Graphical User Interface (GUI) display to the security camera acquirer.

Next in the method 300, input, that one of the first and second three-dimensionally defined points is selected, is received (350), and thereby a confirmed installation point is identified (the confirmed installation point being where a video security camera, different than the at least one substitutional camera, will be permanently installed).

Next in the method 300, location information corresponding to the confirmed installation point is provided (360) to the security camera installer, and this location information enables permanent installation of the video security camera by the security camera installer.

Next in the method 300, verifying (370) is carried out so that an actual installation point of the video security camera is verified as matching the confirmed installation point. In at least one example, the verification is performed, via video analytics, to check whether or not the field of view of the actually installed video security camera is having a dissimilarity exceeding a threshold to the field of view of the substitutional camera at the confirmed installation point with confirmed installation configurations and settings. In one another at least one example, the verification is performed, via a location sensor inside the respective camera (for example, one or more of a GPS sensor, indoor location sensor via Bluetooth™, Wi-Fi™ or Ultra Wideband beaconing and triangulation method, etcetera), to check whether or not the location of the actually installed video security camera (for example, value of GPS coordinates) is having a dissimilarity exceeding a threshold to the location of the substitutional camera at the confirmed installation point with confirmed installation configurations and settings. In one another at least one example, the verification is performed, via a motion sensor inside the respective camera (for example, at least one of an accelerometer, gyrometer, magnetometer, altimeter, etcetera), that an orientation and height of the actually installed video security camera (for example, height and heading direction of the camera) is having a dissimilarity exceeding a threshold to the orientation and height of the substitutional camera at the confirmed installation point with confirmed installation configurations and settings. In another at least one example, the verification is performed, via comparing the camera configurations and settings inside the respective camera (for example, pan-tilt-zoom, PTZ setting, resolutions setting, frame rate setting, infrared setting, night mode setting, etcetera) to check whether or not the configurations and settings of the actually installed video security camera is having a dissimilarity exceeding a threshold to the configurations and settings of the substitutional camera at the confirmed installation point with confirmed installation configurations and settings. In another at least one example, the verification is performed, via comparing the camera model identifier and technical specification of the respective camera (for example, the camera model identifier, resolutions specification, night mode specification, lens specification, etcetera) to check whether or not the camera model and technical specification of the actually installed video security camera is having a dissimilarity exceeding a threshold to the camera model and technical specification that the substitutional camera has simulated at the confirmed installation point with confirmed installation configurations and settings.

During the installation and verification process, visual guidance can be provided to the camera installer (for example, via GUI display on laptop screen, radio display, smartphone touchscreen, augmented reality head mounted display glasses, etcetera) so as to facilitate an actual installation in a similar way to a confirmed installation configuration of what the substitutional camera has simulated. For example, location information and navigation information can be displayed to the camera installer when the camera installer is heading to the confirmed installation location. Also, virtual visual guidance that outlines the confirmed installation orientation may be provided to camera installer's head mounted display in augmented reality view (for example, drawing a virtual outline GUI on the augmented reality display) to indicate the orientation needed for the camera during installation (for example, when screwing in the camera on a pole). Additionally or alternatively, audio instructions may be provided to the camera installer to fine tune the final camera orientation installation (for example, outputted audio instructions via a radio speaker might be something along the lines of the following: "tilt the camera to the west or on your right for 5 degree more").

In at least one example, the actual security camera may automatically apply the right configurations and settings similar to what the substitutional camera has simulated (for example, applying the PTZ setting that has been simulated by the substitutional camera, applying the night mode setting that has been simulated by the substitutional camera, etcetera) based on the confirmed installation plan. In this example, once the confirmed security camera is installed, the right configuration and settings will be automatically retrieved from the system and deployed to the confirmed security camera, based on the confirmed installation plan (i.e. the simulated and confirmed installation plan by the substitutional camera may be mapped to the right configuration assemblage to be deployed to the confirmed security camera).

Reference is now made to FIGS. 3 to 10. FIGS. 3 to 10 are diagrams of GUI screenshots in accordance with example embodiments. In some examples, the system design tool module 145 (FIG. 1) may generate what is shown and described herein as presented on the display screen 126 and corresponding to the GUI screenshots of FIGS. 3 to 10. In other examples, GUIs may be generated by some other suitable software within the security system 100. Also, it will be understood that not all functionality corresponding to the system design tool module 145 need necessarily contained within the computer terminal 104. Some portions may be within the server system 108 or the cloud services 195.

Figure 3:
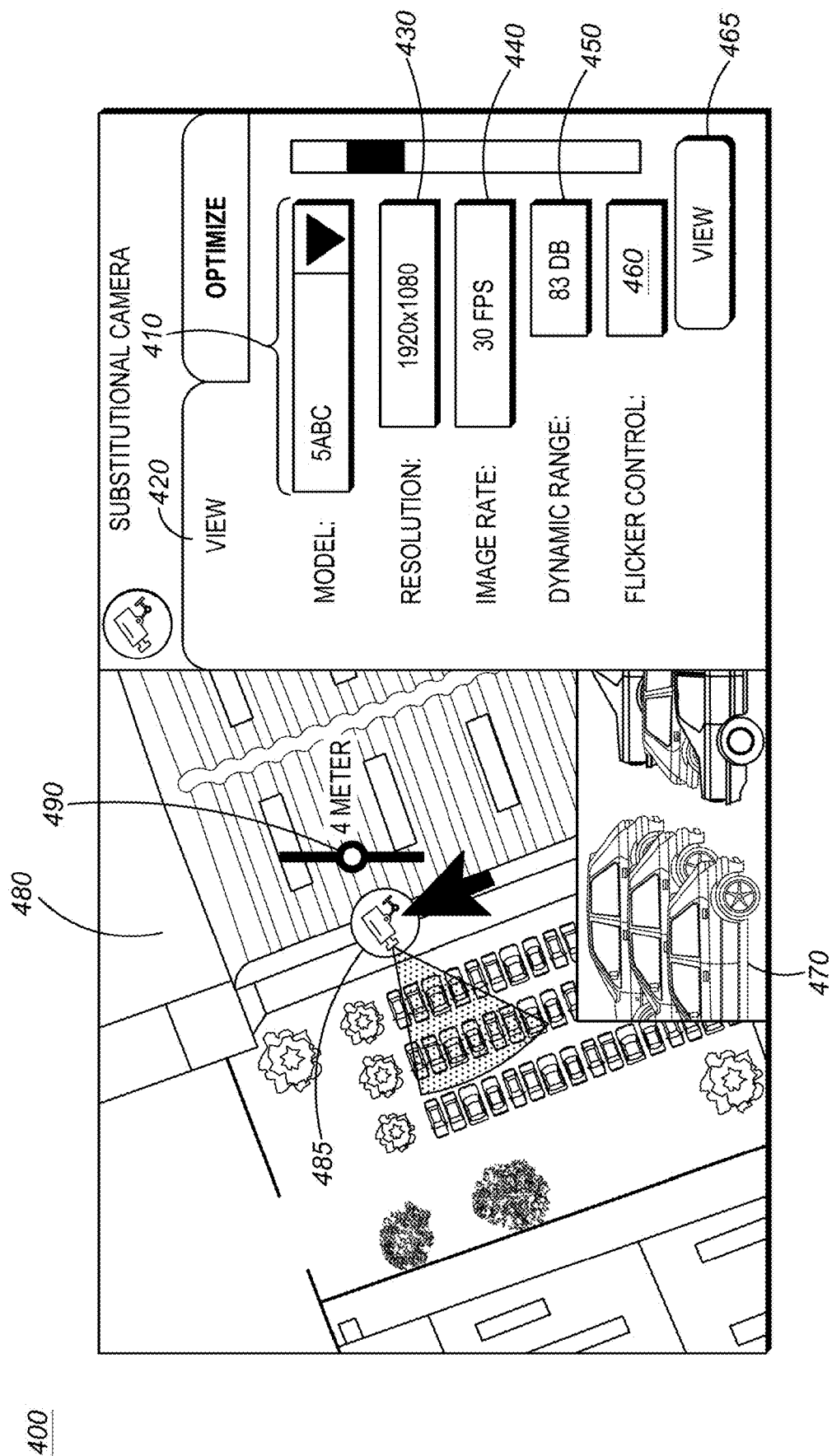
FIG. 3 is a diagram of a first GUI screenshot in accordance with an example embodiment.

Referring to FIG. 3, this is a diagram of a first GUI screenshot 400 in accordance with an example embodiment. In the first GUI screenshot 400, drop-down selector 410 is within a "VIEW" tab 420 and allows selection of a camera model (i.e. model desired to be simulated). Particular camera models may be simulated even if the substitutional camera does not have all of the capabilities or performance of the potentially desired camera model. For example, the substitutional camera may have a lower maximum resolution than that of the potentially desired camera model, and so to simulate the higher resolution of the camera model, at least one of the first and second three-dimensionally defined points (mentioned in the actions 310 and 320 of the method 300 illustrated in FIG. 2) is established in-between a prospective installation point and a target objects-of-interest region to permit the substitutional camera to emulate some expected (higher achievable) performance of the desired camera model. In other words, a shorter distance between a camera and a target objects-of-interest region permits a lower performance camera to emulate a higher performance camera.

In some examples, a plurality of different analytic output data (each corresponding to a different emulated camera model) are compared and a most suitable (e.g. best) video security camera model is determined. The video security camera model determined to be most suitable may be provided to the security camera installer in connection with installing (or potentially installing) the video security camera model (i.e. determined model) permanently at the confirmed installation point.

Still with reference to FIG. 3, additionally within the VIEW tab 420 are a plurality of additional fields related to the settings and capabilities of the selected camera being simulated: resolution field 430, image rate field 440, dynamic range field 450 and flicker control field 460. (It will be understood that these are just example fields for the purpose of illustration, and that other suitable fields are also contemplated.)

Clicking (or otherwise selecting) "VIEW" selector 465 causes display of inset window 470 corresponding to streamed live view video from a substitutional camera positioned at a three-dimensional point. This three-dimensional point is illustratively detailed within window portion 480. In particular, camera icon 485 is placed on a map so as to illustrate the camera's geolocation in two dimensions, and the remaining dimension (height) is illustrated by the "4 METER" graphic indicator 490.

Figure 4:
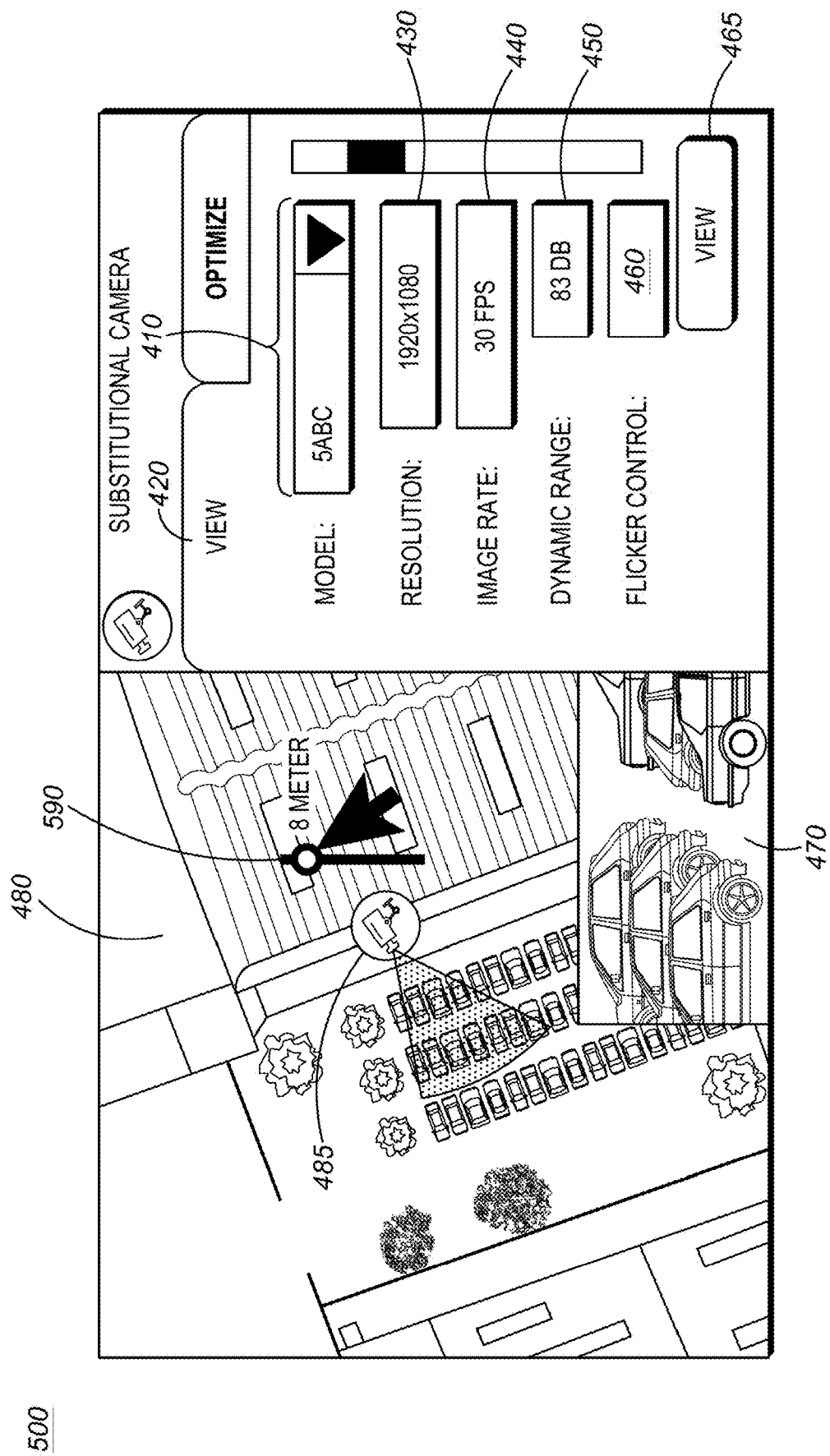
FIG. 4 is a diagram of a second GUI screenshot in accordance with an example embodiment.

Reference is now made to FIG. 4. FIG. 4 is a diagram of a second GUI screenshot 500 in accordance with an example embodiment. The second GUI screenshot 500 is similar to the first GUI screenshot 400, except the "4 METER" graphic indicator 490 is now changed to an "8 METER" graphic indicator 590, meaning a height component of the three-dimensional testing point of the substitute camera has been changed from a height of 4 meters to a height of 8 meters. Also, although the inset window 470 is showing stationary video objects substantially unchanged as between FIG. 4 and FIG. 3, this is simply for simplification of illustration (in practice there would be visibly obvious change associated with doubling a camera placement height unless other camera settings like zoom, tilt, etcetera were correspondingly adjusted to offset the impact of the height change).

Changing the height of the substitutional camera from a height of 4 meters to a height of 8 meters as described above translates into a change from one three-dimensionally defined point for the camera to a different three-dimensionally defined point for the camera. Accordingly different video can be captured at each different location point and test analytics can be run in respect of each captured video generating corresponding analytic output data. Running similar test analytics on different video in the manner as contemplated by the method 300 of FIG. 2 can additionally be extended beyond changing the three-dimensionally defined location point for the substitutional camera to instead changing some camera installation parameter such as, for example, zoom setting for the substitutional camera, an angle of the substitutional camera relative to a ground plane, an orientation of the substitutional camera, camera emulation configurations for different security camera models, etcetera. For instance, and to draw from the presently described example, first video may be captured with the substitutional camera at the 4 meter height with a first camera orientation, second video may be captured with the substitutional camera at the 8 meter height with the first camera orientation, third video may be captured with the substitutional camera at the 4 meter height with a second camera orientation, fourth video may be captured with the substitutional camera at the 8 meter height with the second camera orientation, and then a similar test analytic may be run on each of the first through four recorded videos to generate respective corresponding analytic output data. Capturing four videos (two different location points multiplied by two different camera installation parameters) is just for simplicity of illustration, and the capturing of a larger number of videos associated with a greater scale of testing permutations is contemplated.

Figure 5:
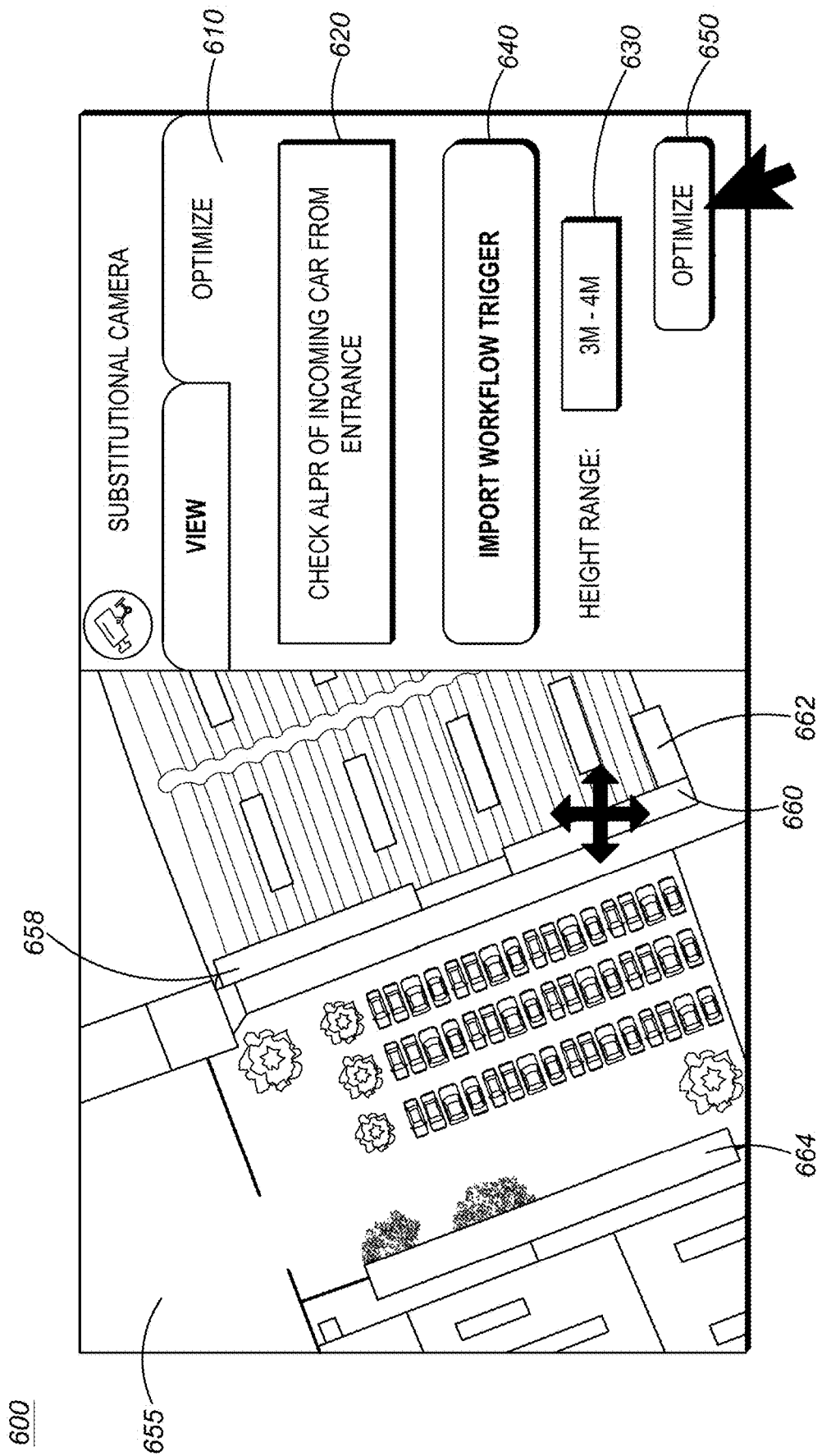
FIG. 5 is a diagram of a third GUI screenshot in accordance with an example embodiment.

Reference is now made to FIG. 5. FIG. 5 is a diagram of a third GUI screenshot 600 in accordance with an example embodiment, and shown therein is an "OPTIMIZE" tab 610. Within the OPTIMIZE tab 610 are fields 620 and 630, as well as selectors 640 and 650.

An installation location map is shown within window portion 655. Within the window portion 655 a user has added rectangular GUI boxes 658, 660, 662 and 664. The rectangular GUI boxes 658, 660, 662 and 664 allow the user to define areas on the map within which the substitutional camera will be positioned for the installation testing.

Figure 6:
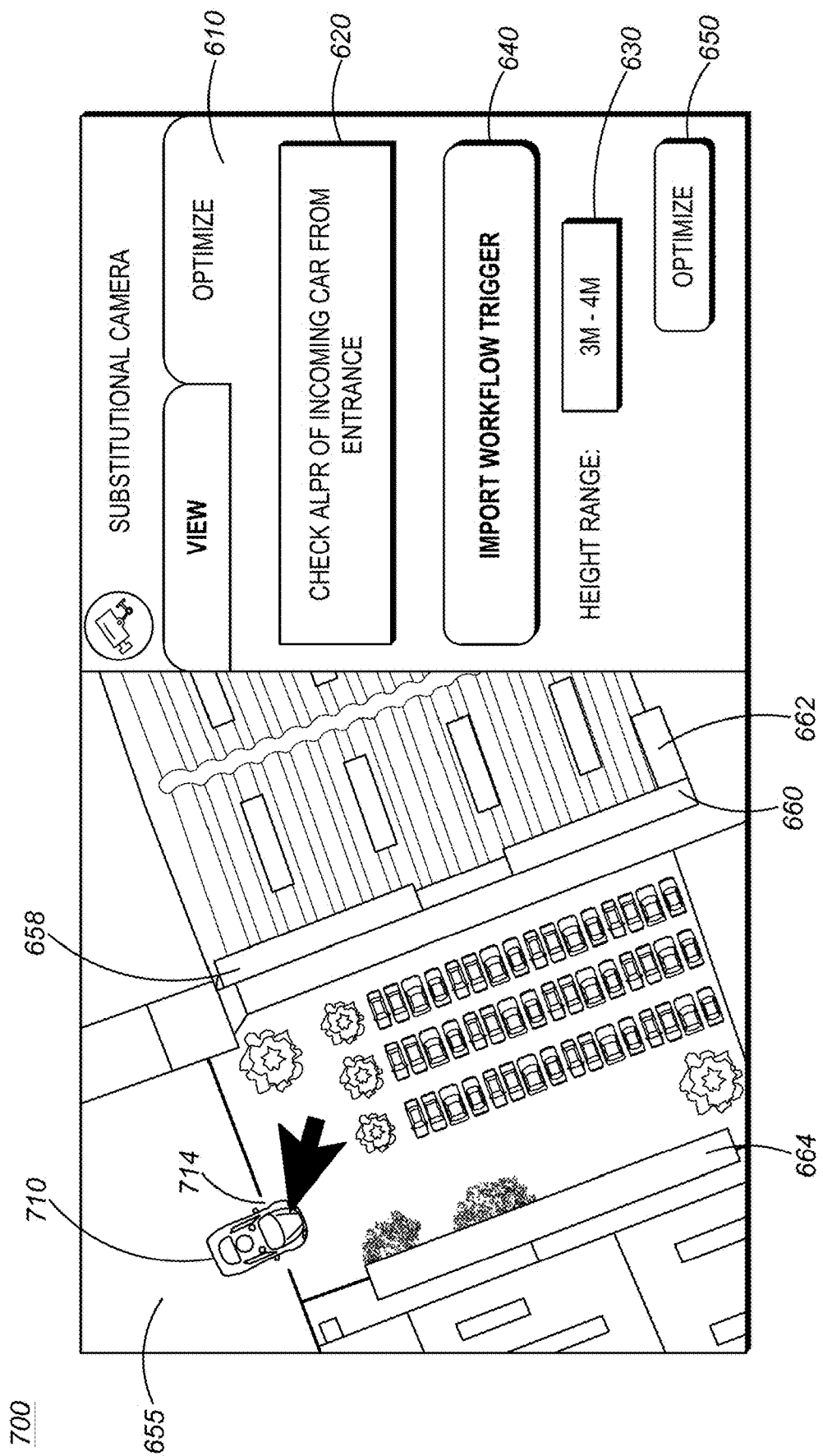
FIG. 6 is a diagram of a fourth GUI screenshot in accordance with an example embodiment.

Reference is now made to FIG. 6. FIG. 6 is a diagram of a fourth GUI screenshot 700 in accordance with an example embodiment. The fourth GUI screenshot 700 is similar to the third GUI screenshot 600, except for the addition of icon 710 corresponding to an analytic target location. In the illustrated example embodiment, Automatic License Plate Recognition (ALPR) is conducted at an entrance 714 to a parking lot at the installation premises (i.e. consistent with "CHECK ALPR OF INCOMING CAR FROM ENTRANCE" in the field 620). Consequently, the placement of the icon 710 on the map is corresponding that entrance location. The icon 710 (in this example, a car image icon) and the location of the icon 710 (in this example, at the entrance location) may be automatically determined based on analytic requirement information within the field 620 (in this example, the analytic requirement is to perform ALPR, to obtain a vehicle license plate number of an incoming car at the entrance). Also, it is contemplated that a user of the GUI can then further drag on the icon 710 to fine tune the location of the desired analytic target.

Regarding the selector 640, in some examples this sends a request to the workflow management module 192 to import a workflow trigger. The workflow management module 192 may form a part of software for the creation and management of requests and response from other system(s) (for example, one or more of a private radio system, an access control system, etcetera) that may cooperate with the security system 100. For instance, an example workflow trigger of "License plate of incoming car from entrance does not belong to employee" may be associated with example workflow actions of "Lock Gate A" and "Notify security guard Smith" in the security system 100 of the camera system deployment site. Thus, when the selector 640 is actuated, the analytic requirement input of "Check ALPR (license plate) of incoming car from entrance" will be automatically imported and displayed within the field 620, based on the workflow trigger of "License plate of incoming car from entrance does not belong to employee" (indicating a need to perform a license plate analytic). In another example, users may key in some desired analytic input directly, via text input, to the field 620, and the analytic requirement will be determined via, for instance, Natural Language Processing (NLP) on the inputted text. Some additional example details regarding implementation and management of workflows are disclosed in U.S. Pat. No. 11,495,119 of Lim et al.

Figure 7:
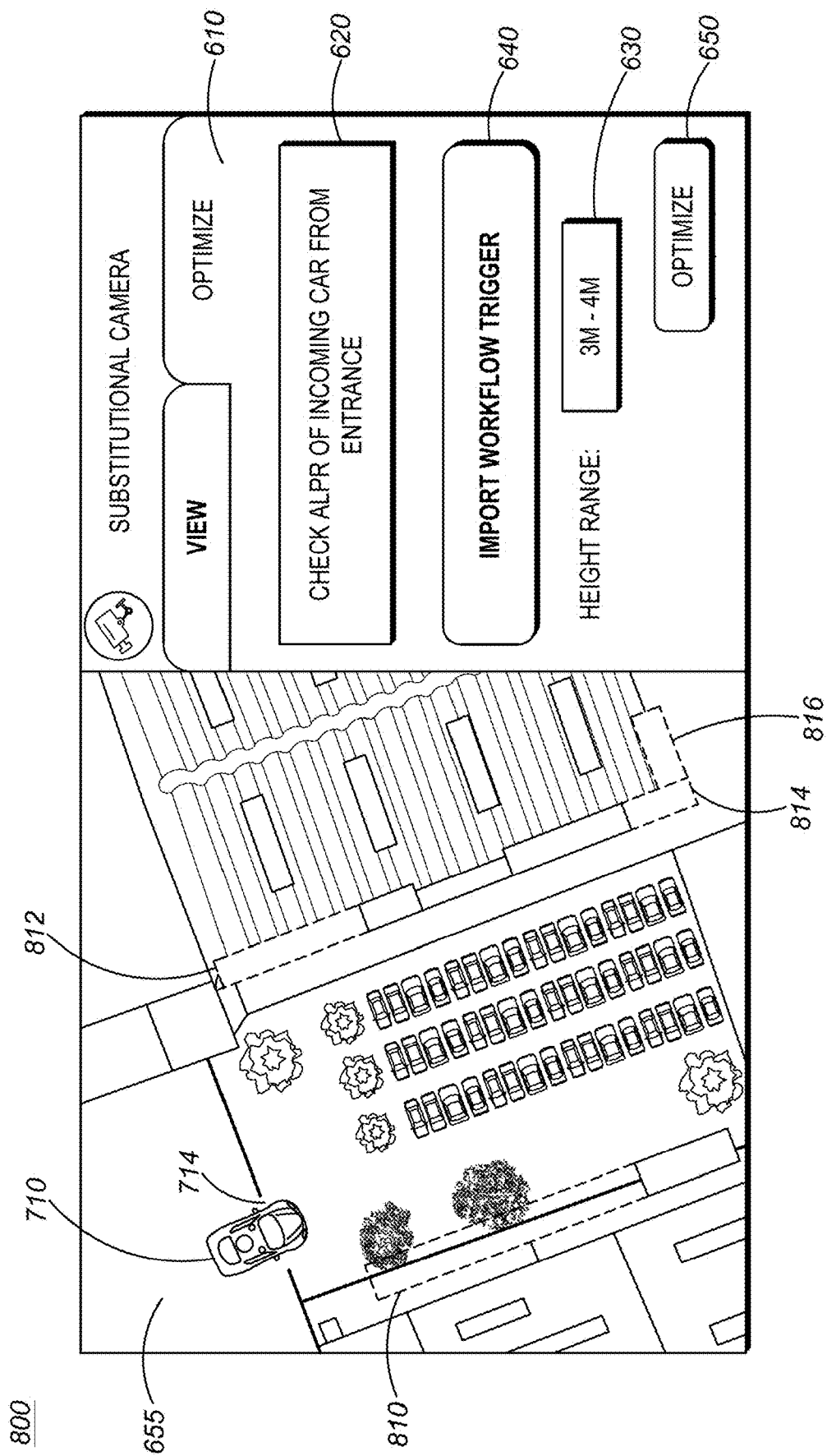
FIG. 7 is a diagram of a fifth GUI screenshot in accordance with an example embodiment.

Reference is now made to FIG. 7. FIG. 7 is a diagram of a fifth GUI screenshot 800 in accordance with an example embodiment. The fifth GUI screenshot 800 is similar to the fourth GUI screenshot 700, except for the inclusion of dashed GUI boxes 810, 812, 814 and 816. The dashed GUI boxes 810, 812, 814 and 816 correspond to subregions of the larger GUI boxes 658, 660, 662 and 664 (FIG. 6) where camera installation is predicted as being bad for carrying out one or more specific analytics (i.e. ALPR at the location of the entrance 714 for the illustrated example embodiment). The predictions corresponding to the bad versus good installation subregions may be carried out automatically (for example, by a prediction engine included in the system design tool module 145). Furthermore, the predictions may be made from relevant acquired data such as, for instance, obstructions (tree, shrubs, etcetera), limitations of a particular camera model, etcetera. In at least one example, clicking on the selector 650 initiates generation of the above described predictions.

Figure 8:
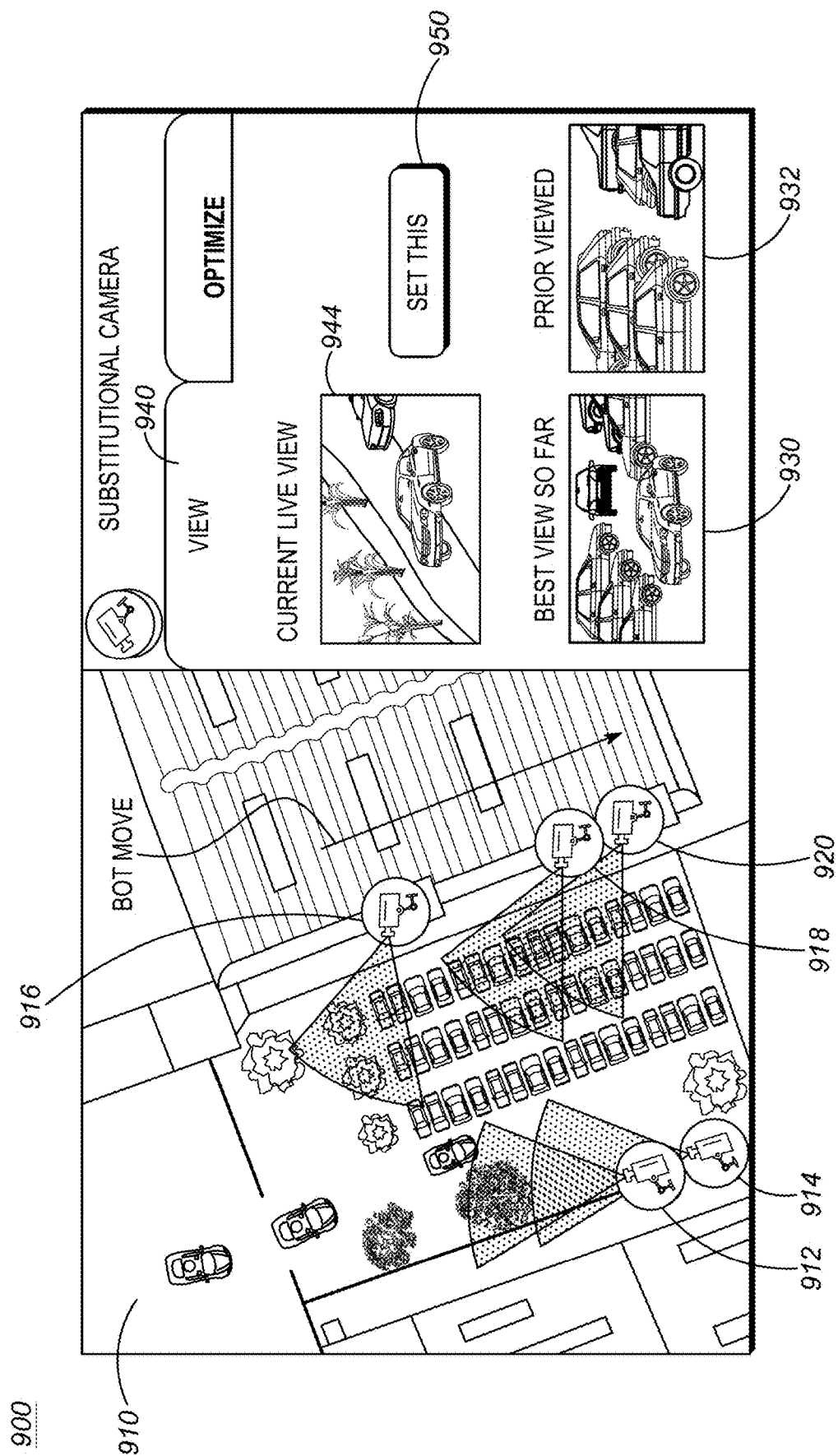
FIG. 8 is a diagram of a sixth GUI screenshot in accordance with an example embodiment.

Reference is now made to FIG. 8. FIG. 8 is a diagram of a sixth GUI screenshot 900 in accordance with an example embodiment. Within window portion 910 are illustrated a plurality of camera icons 912, 914, 916, 918 and 920. The camera icons 912, 914, 916, 918 and 920 correspond to locations where the substitutional camera has been (or is being) tested.

Thumbnail images 930 and 932 within VIEW tab 940 correspond to past captured video. The thumbnail image 930 is showing the "best view" so far (i.e. at the depicted moment of time) during the optimization process (and in terms of the best view, this may, for example, be determined by highest detection counts, highest confidence level, or a combination of both). The thumbnail image 932 is showing the prior camera view at the location that the user selected as a camera setup location (as well as prior camera configuration) before any optimization having been performed. An impact of the above is allowing the user to compare the view before optimization (corresponding to the thumbnail image 932) and the best view during optimization (corresponding to the thumbnail image 930) or the current live view during optimization (associated with thumbnail image 944 that is within the VIEW tab 940 relating to an image from the present camera location being tested). "SET THIS" selector icon 950 enables a user to mark the current camera setup configuration (i.e. at a particular moment in time when the substitutional camera is optimizing its camera configuration and a current view being live stream viewable to the user) that the substitutional camera is simulating as a potential final camera setup configuration (for example, when user is looking at the live view and thinks that current view is his pick, then the user can actuate the selector icon 950 to save the currently simulated configuration as the potential final configuration, or as a preferred simulated configuration that can be retrieved later).

Figure 9:
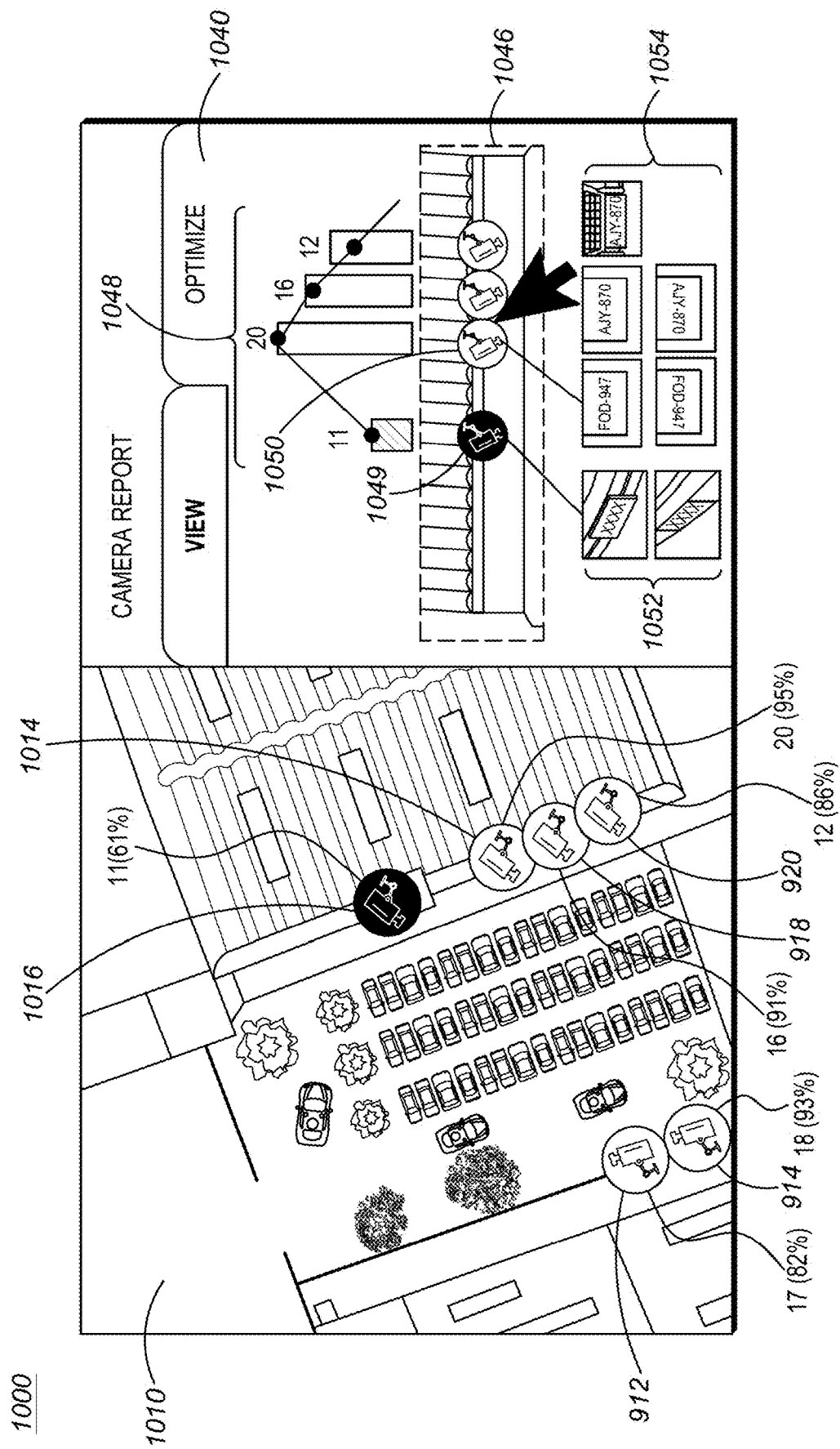
FIG. 9 is a diagram of a seventh GUI screenshot in accordance with an example embodiment.

Reference is now made to FIG. 9. FIG. 9 is a diagram of a seventh GUI screenshot 1000 in accordance with an example embodiment. Within window portion 1010 are illustrated the camera icons 912, 914, 918 and 920, and also camera icons 1014 and 1016. As mentioned before, these camera icons correspond to locations where the substitutional camera has been (or is being) tested.

Each of the camera testing locations has a corresponding detections count and average detection confidence level as shown explicitly in the diagram. For example, "11 (61%)" is corresponding to the testing location identified by the camera icon 1016 (11 is the detection count and 61% is the detection confidence level), "20 (95%) is corresponding to the testing location identified by the camera icon 1014, etc.

An OPTIMIZE tab 1040 is also shown in the GUI screenshot 1000. Within the OPTIMIZE tab 1040 is a simplified pictorial representation 1046 of camera icons shown in the map view within the window portion 1010, and also a composite graph 1048 displaying performance metrics corresponding to the testing locations. Within the illustrated GUI screenshot 1000 the composite graph 1048 is positioned above the pictorial representation 1046 with each graph bar vertically aligned with a respective icon in the pictorial representation 1046. For example, one graph bar is aligned with icon 1049 in the pictorial representation 1046 (corresponding to the camera icon 1016 in the window portion 1010) and one graph bar is aligned with icon 1050 in the pictorial representation 1046 (corresponding to the camera icon 1014 in the window portion 1010). Also within the OPTIMIZE tab 1040 are: i) two clustered thumbnails 1052 of license plate images linked to the icon 1049 (and its corresponding camera testing location); and ii) five clustered thumbnails 1054 of license plate images linked to the icon 1050 (and its corresponding camera testing location). In one example, clicking on any of the icons (for example, the icon 1049) inside the pictorial representation 1046 will result in displaying the images (for example, the clustered thumbnails 1052) captured by the substitutional camera when it is at the respective location (location corresponding to where the icon is shown within the window portion 1010). In one example, the icon 1049 and the associated camera icon 1016 may be displayed in a different color and/or shading coding (darker shading in the illustrated example GUI screenshot) due to the analytic detections count or confidence level (in the illustrated example GUI screenshot, 11 and 61%) at this location being lower than a threshold or is at some lower value compared to other locations that have contrasting color and/or shading coding.

Figure 10:
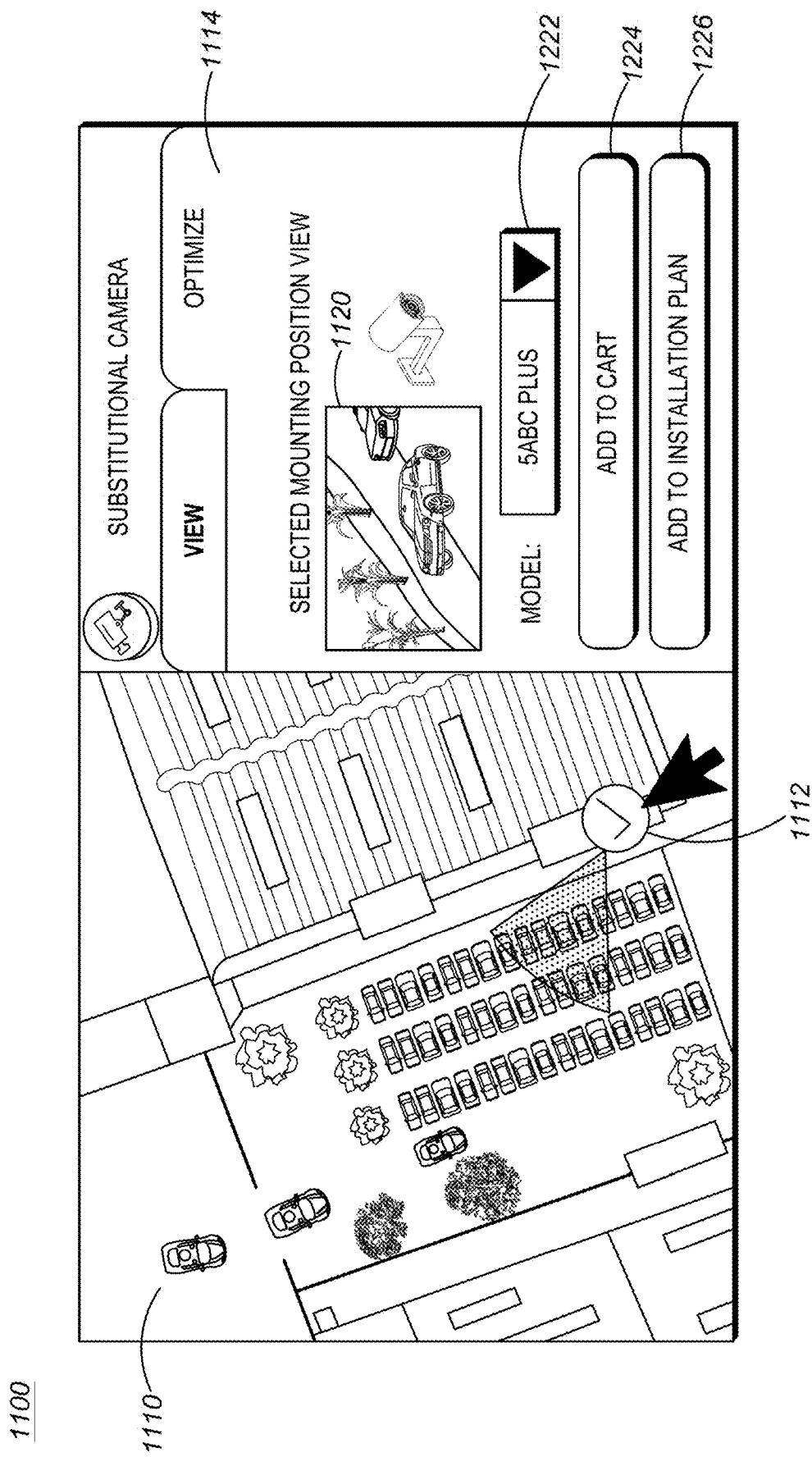
FIG. 10 is a diagram of an eighth GUI screenshot in accordance with an example embodiment.

Reference is now made to FIG. 10. FIG. 10 is a diagram of an eighth GUI screenshot 1100 in accordance with an example embodiment. Within window portion 1110 there is shown a check mark icon 1112. The check mark of the check mark icon 1112 is meant to visually indicate a camera location that is selected (for example, user selected) as a chosen camera installation location from amongst other tested camera locations for potential camera installation.

An OPTIMIZE tab 1114 is also shown in the GUI screenshot 1100. Thumbnail image 1120 within the OPTIMIZE tab 1114 corresponds to an image from the selected camera location (i.e. location corresponding to the check mark icon 1112). Drop-down selector 1222 corresponds to a camera model selector (for example, selecting one of a plurality of different camera models available for purchase). In one example, the camera model identified in the drop-down selector 1222 may be automatically selected and recommended by the software based on analytic data collected during the optimization process. In the illustrated example GUI screenshot, camera model 5ABC PLUS is determined to be having the highest detection counts and highest confidence level at the location corresponding to the check mark icon 1112, after the system having performed simulation of different camera models by employing the substitutional camera (for example, by changing configurations of the substitutional camera to simulate different camera models) at the location corresponding to the check mark icon 1112. "ADD TO CART" selector 1224 is provided within the OPTIMIZE tab 1114 (for example, clicking on it causes the chosen or recommended camera model to be added to a virtual shopping cart). "ADD TO INSTALLATION PLAN" selector 1226 is also provided within the OPTIMIZE tab 1114 (for example, clicking on it causes an installation services plan to be added to a virtual shopping cart). The installation plan or services plan may be including information of the determined camera model, the camera mounting location, the camera mounting height, the camera mounting angle, the camera configurations and settings, etc.

Figure 11:
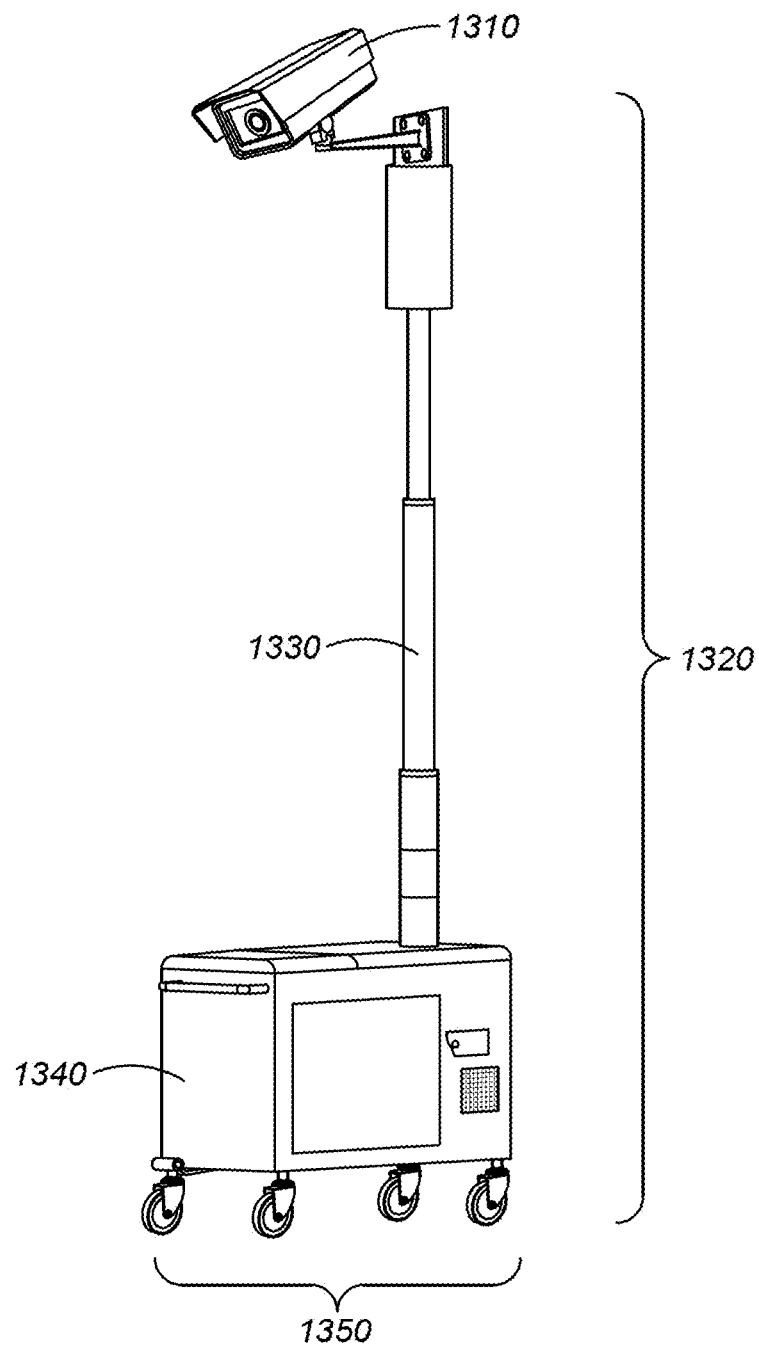
FIG. 11 is a diagram of a substitutional camera attached to moveable pole apparatus in accordance with an example embodiment.
Figure 12:
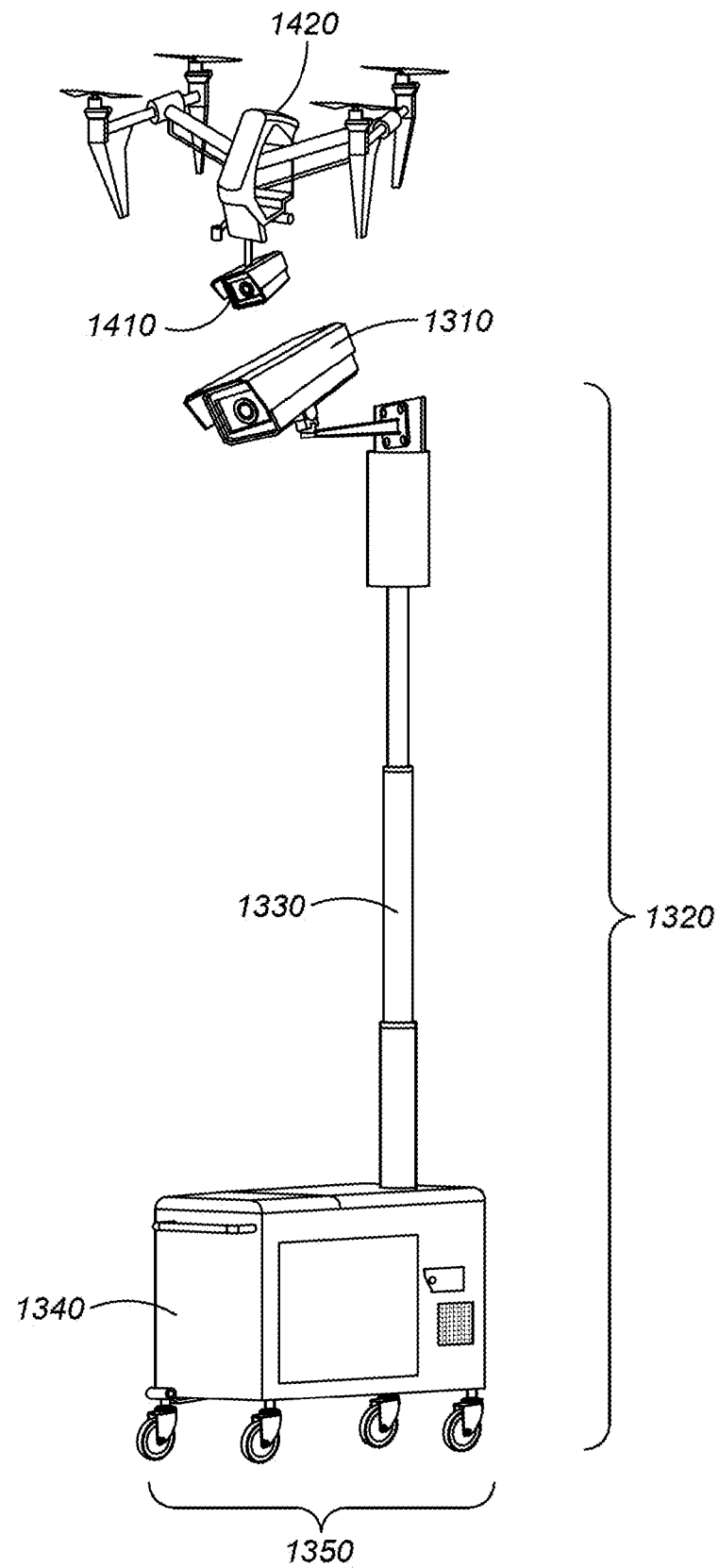
FIG. 12 is a diagram of two substitutional cameras in accordance with an example embodiment, a first of the two substitutional cameras being attached to an Unmanned Aerial Vehicle (UAV), and the second of the two substitutional cameras being attached to the same apparatus illustrated in FIG. 11.
Figure 13:
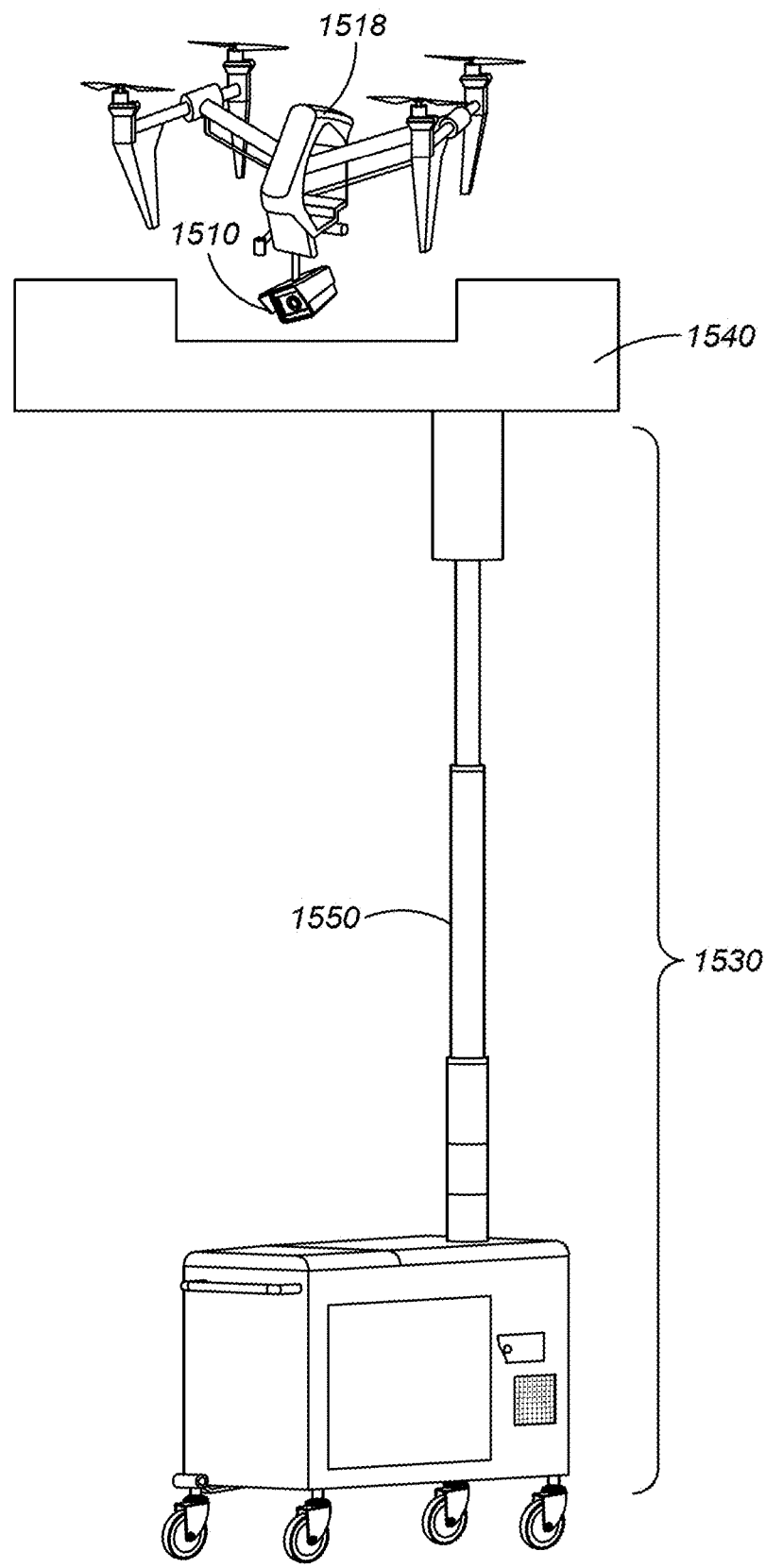
FIG. 13 is a diagram of a substitutional camera attached to a drone that is dockable on top of moveable pole apparatus in accordance with an example embodiment.

Reference is now made to FIGS. 11 to 13 which illustrate details of apparatus providing mobility and positioning support for various alternative substitutional cameras in accordance with example embodiments. To the extent suitable compatibility would be apparent to one skilled in the art, any of the previous discussion herein in relation to the substitutional cameras is applicable to the substitutional cameras shown in FIGS. 11 to 13.

FIG. 11 is a diagram of a substitutional camera 1310 attached to moveable pole apparatus 1320 in accordance with an example embodiment. The moveable pole apparatus 1320 includes a retractable pole 1330 to which the substitutional camera 1310 is attached. Changing a height (i.e. by raising or lowering action) of the retractable pole 1330 produces a corresponding change in a height of the substitutional camera 1310. The moveable pole apparatus 1320 also includes a cart portion 1340 and a plurality of wheels 1350 which are attached to a bottom surface of the cart portion 1340 and which facilitate displacement of the moveable pole apparatus 1320 along ground surface at a camera installation location.

FIG. 12 is a diagram of two substitutional cameras in accordance with an example embodiment. One of the two substitutional cameras (and correspondingly attached moveable pole apparatus) are the same substitutional camera 1310 and moveable pole apparatus 1320 of FIG. 11 described above. The other of the two substitutional cameras is a substitutional camera 1410 attached to an Unmanned Aerial Vehicle (UAV) 1420. In accordance with the example embodiment of FIG. 12, the substitutional camera 1310 and the substitutional camera 1410 may be employed together cooperatively. For instance, the substitutional camera 1410 may be operated for those testing point locations too far above a ground surface to be reached by pole extension of the moveable pole apparatus 1320, whereas conversely the substitutional camera 1310 may be operated for those testing point locations which are not too far above a ground surface to be reached by pole extension of the moveable pole apparatus 1320. During the optimization process, when the substitutional cameras changes from one location to another different location, different types of substitutional camera (for example, either the camera 1410 attached to the UAV 1420 or the camera 1310 with moveable pole apparatus 1320) may be dispatched to the respective location based on the height of the respective location.

FIG. 13 is a diagram of a substitutional camera 1510 attached to a UAV 1518 that is dockable on top of moveable pole apparatus 1530 via a UAV docking station 1540 in accordance with an example embodiment. More specifically, the UAV 1518 is configured to be selectively docked at the UAV docking station 1540 located at an end of retractable pole 1550. When a particular testing point location is not too far above a ground surface to be reached by pole extension of the moveable pole apparatus 1530, then the UAV 1518 will remain docked. Conversely, when a particular testing point location is too far above a ground surface to be reached by pole extension of the moveable pole apparatus 1530, then the UAV 1518 will be deployed to permit the substitutional camera 1510 to reach the otherwise unreachable testing point location.

In at least one example, the right substitutional camera will be deployed and dispatched to the simulation location, based on the camera model and technical specification that the substitutional camera needs to simulate. For example, if a night mode simulation is needed, a substitutional camera that equipped with night mode capability (for example, equipped with an IR hardware module) will be dispatched and moved to the appropriate locations). As another example, if a dual-head camera simulation is needed, a substitutional camera that has two cameras integrated in one camera housing or two separate substitutional cameras, will be dispatched and moved to the appropriate locations.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot process video analytics data to assess performance of a security camera, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for enhancing a collaborative installation experience between a security camera installer and a security camera acquirer, the computer-implemented method comprising:
receiving first video captured by an at least one substitutional camera while temporarily positioned at a first three-dimensionally defined point of a plurality of different three-dimensional points located at an installation site associated with the security camera acquirer;
receiving second video captured by the at least one substitutional camera while temporarily positioned at a second three-dimensionally defined point of the plurality of different three-dimensional points;
running an at least substantially similar test analytic on each of the first video and the second video to generate:
first analytic output data corresponding to analytic processing of the first video, and
second analytic output data corresponding to analytic processing of the second video;
assembling for Graphical User Interface (GUI) display to the security camera acquirer, the first and second analytic output data, or performance data derived therefrom;
after the assembling for the GUI display, receiving input that one of the first and second three-dimensionally defined points is selected, thereby identifying a confirmed installation point where a video security camera, different than the at least one substitutional camera, will be permanently installed;
providing location information corresponding to the confirmed installation point to the security camera installer to enable permanent installation of the video security camera by the security camera installer; and
after the permanent installation of the video security camera by the security camera installer, verifying that an actual installation point of the video security camera matches the confirmed installation point.

2. The computer-implemented method of claim 1 wherein the at least one substitutional camera comprises a camera attached to a retractable pole.

3. The computer-implemented method of claim 2 wherein:
the at least one substitutional camera includes a first camera attached to an Unmanned Aerial Vehicle (UAV) and a second camera that is the camera attached to the retractable pole,
the first and second videos are captured by the first and second cameras respectively,
the first three-dimensionally defined point is beyond a reach range of the retractable pole, and
the second three-dimensionally defined point is within the reach range of the retractable pole.

4. The computer-implemented method of claim 1 wherein the at least one substitutional camera comprises a camera attached to a UAV which is configured to be selectively docked at a station located at an end of a retractable pole.

5. The computer-implemented method of claim 1 wherein the at least one substitutional camera has a lower maximum resolution that the video security camera, and the at least one of the first and second three-dimensionally defined points is in-between a prospective installation point and a target objects-of-interest region to permit the at least one substitutional camera to emulate some expected performance of the video security camera.

6. The computer-implemented method of claim 1 further comprising, in respect of each of the first video and the second video, simulating a workflow assignment triggered by operation of the respective test analytic, wherein:
data from the simulating of the workflow assignment is included in the performance data that is assembled for the GUI display, and
a respective test analytic input of the test analytics is determined by retrieving at least one trigger criteria from a security workflow system that has been setup at the installation site.

7. The computer-implemented method of claim 1 further comprising:
receiving third video captured by the at least one substitutional camera while temporarily positioned at the first three-dimensionally defined point;
receiving fourth video captured by the at least one substitutional camera while temporarily positioned at the second three-dimensionally defined point; and
running the at least substantially similar test analytic on each of the third video and the fourth video to generate:
third analytic output data corresponding to analytic processing of the third video, and
fourth analytic output data corresponding to analytic processing of the fourth video,
wherein each of the third video and the fourth video are captured with an at least one different camera installation parameter than a corresponding at least one camera installation parameter for the first video and the second video respectively.

8. The computer-implemented method of claim 7 wherein the at least one camera installation parameter is a zoom setting for the at least one substitutional camera.

9. The computer-implemented method of claim 7 wherein the at least one camera installation parameter is an angle of the at least one substitutional camera relative to a ground plane.

10. The computer-implemented method of claim 7 wherein the at least one camera installation parameter is an orientation of the at least one substitutional camera.

11. The computer-implemented method of claim 7 wherein the at least one different camera installation parameter is a camera configuration of the at least one substitutional camera to emulate a first video security camera model that is different from a second video security camera model that the first video and the second video are emulating.

12. The computer-implemented method of claim 11 further comprising:
comparing the first and third analytic output data;
comparing the second and fourth analytic output data;
determining a video security camera model that is better in performing a tested test analytic at the first and second three-dimensionally defined points; and
providing the determined video security camera model to the security camera installer to install the determined video security camera model permanently at the confirmed installation point.

13. The computer-implemented method of claim 1 further comprising transmitting the first and second videos to an at least one electronic device configured to display at least one of the first and second videos as live video.

14. The computer-implemented method of claim 1 wherein the running of the at least substantially similar test analytic on each of the first video and the second video includes carrying out a plurality of object detections, and the first and second analytic output data including confidence data corresponding to the plurality of object detections.

15. A system comprising:
   at least one processor configured to:
      receive first video captured by an at least one substitutional camera while temporarily positioned at a first three-dimensionally defined point of a plurality of different three-dimensional points located at an installation site associated with a security camera acquirer;
      receive second video captured by the at least one substitutional camera while temporarily positioned at a second three-dimensionally defined point of the plurality of different three-dimensional points;
      run an at least substantially similar test analytic on each of the first video and the second video to generate:
         first analytic output data corresponding to analytic processing of the first video, and
         second analytic output data corresponding to analytic processing of the second video;
      output location information corresponding to a confirmed installation point to enable permanent installation of a video security camera, different than the at least one substitutional camera, by a security camera installer; and
      verify, after the permanent installation of the video security camera by the security camera installer, that an actual installation point of the video security camera matches the confirmed installation point; and
   a computer terminal including:
      a display configured to graphically present the first and second analytic output data, or performance data derived therefrom, and
      at least one input device configured to be user operated to provide input that one of the first and second three-dimensionally defined points is selected, thereby identifying a confirmed installation point where the video security camera will be permanently installed.

16. The system of claim 15 further comprising a retractable pole and the at least one substitutional camera, the at least one substitutional camera being attached thereto.

17. The system of claim 16 wherein:
   the at least one substitutional camera includes a first camera attached to an Unmanned Aerial Vehicle (UAV) and a second camera being attached to the retractable pole,
   the first and second videos are captured by the first and second cameras respectively,
   the first three-dimensionally defined point is beyond a reach range of the retractable pole, and
   the second three-dimensionally defined point is within the reach range of the retractable pole.

18. The system of claim 15 further comprising a retractable pole and the at least one substitutional camera, the at least one substitutional camera including a camera attached to a UAV which is configured to be selectively docked at a station located at an end of the retractable pole.

19. The system of claim 15 wherein the at least one substitutional camera has a lower maximum resolution that the video security camera, and the at least one of the first and second three-dimensionally defined points is in-between a prospective installation point and a target objects-of-interest region to permit the at least one substitutional camera to emulate some expected performance of the video security camera.

* * * * *